(12) United States Patent
Sunderland et al.

(10) Patent No.: US 11,510,414 B2
(45) Date of Patent: Nov. 29, 2022

(54) REDUCED SUGAR WAFER

(71) Applicant: NESTEC S.A., Vevey (CH)

(72) Inventors: Charles-Austin Sunderland, Laversines (FR); John Green, Le Mont St. Adrien (FR); Louis De Labauve D'Arifat, Pereybere (MU)

(73) Assignee: Societe des Produits Nestle S.A., Vevey (CH)

( * ) Notice: Subject to any disclaimer, the term of this patent is extended or adjusted under 35 U.S.C. 154(b) by 702 days.

(21) Appl. No.: 16/314,727

(22) PCT Filed: Jul. 7, 2017

(86) PCT No.: PCT/EP2017/067051
§ 371 (c)(1),
(2) Date: Jan. 2, 2019

(87) PCT Pub. No.: WO2018/007571
PCT Pub. Date: Jan. 11, 2018

(65) Prior Publication Data
US 2019/0313652 A1    Oct. 17, 2019

(30) Foreign Application Priority Data
Jul. 8, 2016  (EP) ..................................... 16178527

(51) Int. Cl.
*A21D 13/45*    (2017.01)
*A21D 10/04*    (2006.01)
(Continued)

(52) U.S. Cl.
CPC ............. *A21D 10/04* (2013.01); *A21D 2/181* (2013.01); *A21D 2/364* (2013.01); *A21D 13/062* (2013.01); *A21D 13/45* (2017.01)

(58) Field of Classification Search
None
See application file for complete search history.

(56) References Cited

U.S. PATENT DOCUMENTS

| 7,223,437 B2 | 5/2007 | Marsland |
| 2002/0150663 A1 | 10/2002 | Haas et al. |
| 2011/0027412 A1 | 2/2011 | Spence et al. |

FOREIGN PATENT DOCUMENTS

| EP | 0586250 | 3/1994 |
| GB | 2341306 | 3/2000 |

(Continued)

OTHER PUBLICATIONS

Griffin, et al. "Non-digestible oligosaccharides and calcium absorption in girls with adequate calcium intakes". Br J Nutr, 2002, May, Suppl 2:S187-91, p. 1. (Year: 2002).*

*Primary Examiner* — Jenna A Watts
(74) *Attorney, Agent, or Firm* — K&L Gates LLP

(57) ABSTRACT

The present invention relates a sugar reduced wafer composition comprising, 60-80 wt. % of flour, 10-23 wt. % of sucrose, 0.5-8.0 wt. %, preferably 0.5-5 wt. % of oil or fat and 5-20 wt. % of non-digestible fibers wherein the total amount of mono and disaccharides is 10-25 wt. %; all wt. % being in weight percentage of the composition dry mass. The invention also relates to a baked sugar reduced wafer such as a wafer cone or edible container made with this composition and a process for manufacturing the sugar reduced wafer.

19 Claims, 2 Drawing Sheets

(51) Int. Cl.
*A21D 2/18* (2006.01)
*A21D 2/36* (2006.01)
*A21D 13/062* (2017.01)

(56) References Cited

FOREIGN PATENT DOCUMENTS

| | | | |
|---|---|---|---|
| RU | 85074 | U1 | 7/2009 |
| RU | 95225 | U1 | 6/2010 |
| RU | 2495573 | C1 | 10/2013 |
| RU | 2538112 | C1 | 1/2015 |
| WO | 9849905 | | 11/1998 |
| WO | 0239820 | | 5/2002 |
| WO | 2009149947 | | 12/2009 |

\* cited by examiner

REDUCED SUGAR WAFER

CROSS REFERENCE TO RELATED APPLICATIONS

The present application is a National Stage of International Application No. PCT/EP2017/067051, filed on Jul. 7, 2017, which claims priority to European Patent Application No. 16178527.4, filed on Jul. 8, 2016, the entire contents of which are being incorporated herein by reference.

FIELD OF THE INVENTION

The present invention relates to sugar reduced wafer cone for frozen confections, in particular to a sugar reduced wafer composition that does not contain high intensity sweeteners or polyols. The invention also relates to a process of manufacturing the sugar reduced wafer composition; and to the use of said sugar reduced wafer composition for cones or edible containers for frozen confection.

BACKGROUND

Ice cream is a highly appreciated frozen treat. Different formats are available to consume ice cream, among which cones are particularly widespread. Texture, flavor and crispiness of the cones wafer are key drivers for consumer's preference.

With the increasing concern for health and wellness there is a need for reducing calories and sugars in ice cream wafer cones.

There are two ways to obtain this conical edible container: either by moulding the batter in the shape of a cone, or by baking the batter and rolling the still hot wafer in the shape of a cone.

Moulded cones don't have the same crispiness as the rolled cones. Moreover, moulded cones do not have the same appearance and are perceived as lower quality products by consumers. Generally speaking rolled cones are preferred by consumers for texture and aesthetic appearance.

For sugar wafers the flexibility of the low moisture (e.g. at 1.5%), as the sugar wafer leaves a baking oven, is due in the most part to its high sugar content. The sugar physically reduces what is termed the glass transition temperature of the wafer, a temperature range above which the wafer remains flexible and below which it is rigid.

The complex phenomenon of glass transition, the point where a glassy/rigid material transforms into a flexible viscoelastic/flexible material and eventually into a melt, has been described at length in published literature. The change can be brought about by heating the material and as the phenomenon is reversible the material will regain its glassy/rigid state again on cooling.

In the case of baking a sugar wafer the liquid batter is transformed during baking to wafer that has around 1.5% moisture. The presence of high levels of sugar keep the hot wafer flexible (viscoelastic) so it can be rolled into a cone, which solidifies (glassy state) on cooling.

Due to the complex mix of starch and protein of the flour plus the added sugar, oil, water and salt that is comprised in a wafer it is difficult to measure or predict the Tg of a recipe and hence its flexibility of rolling. It is however known that reducing the sugar content of a wafer recipe will make the wafer more difficult to roll as it loses its flexibility. The lower the sugar the less flexible the wafer after baking.

Furthermore, the ability to roll a wafer is strongly related to the wafer composition.

The glass transition (Tg) of a complex mixture is a range of temperature. However, for the sake of clarity, Tg will be expressed as a precise temperature value corresponding to the median of said range. Above its Tg, an amorphous material gets soft and can be bend without breaking. Below its Tg, said amorphous material will break if bended or rolled, as it is the case for a wafer.

High intensity sweeteners and polyols are ingredients known in the prior art to achieve this effect. They can maintain a Tg high enough to provide a wafer that can be rolled while also balance the sweetness reduction due to the lower content of sucrose. However high intensity sweeteners and polyols are sometimes perceived badly by consumers because of non-natural nature and of the digestive discomfort they may induce if consumed in large quantities. Salt such as Sodium Chloride may also be added to increase the Tg, but they will give an undesirable salty taste.

Finally, balance of the total solid amount by replacing the sugar with flour does not provide a wafer that can be rolled.

CA 2,016,961 A1 discloses a sugar free wafer. Egg whites and thickeners based on cellulose are used to grant flexibility to the wafer. The sugar free wafer does not contain sucrose or non-digestible fibres.

WO 2009 007260 discloses a no- or low sugar wafer. Three steps are required to form the wafer: pre-baking, shaping and drying. Batter contains less than 10% sucrose. Example provided of batter contains only water, flour and salt. Wafers are molded, not rolled into shape. WO 2009 007260 discloses cites a traditional teaching that a wafer batter is impossible to roll into a cone unless it contains more than 25% sucrose.

US 2008 032012 discloses a wafer batter with a sucrose content of at least 23%, and the use of a sucrose substitutes such as trehalose to keep the elasticity of the wafer shortly after the baking process. However, the use of trehalose does not improve the nutritional profile of the wafer.

WO 2009 149947 discloses no- or low sugar flat wafers such as the one used in confectionery products. Wafer contains at maximum 10% sucrose. Wafers disclosed are not plastic enough to be rolled into a cone.

The prior art does not teach any acceptable way to reduce the amount of sucrose in a wafer that has to be rolled to form a cone.

OBJECT OF THE INVENTION

Thus, it is an object of the present invention to provide a wafer composition, with a Tg high enough to be suitable to form a cone, with a sucrose content below 23 wt. % without using high intensity sweeteners or polyols.

SUMMARY OF THE INVENTION

In a first aspect, the invention relates to a sugar reduced wafer composition comprising,
  60-80 wt. % of flour,
  10-23 wt. % of sucrose,
  0.5-8.0 preferably 0.5-5 wt. % of oil or fat and
  5-20 wt. % of non-digestible fibers
  wherein the total amount of mono and disaccharides is 10-25 wt. %;
  all wt. % being in weight percentage of the composition dry mass.

A second aspect of the present invention is to provide a wafer composition with good textural properties despite a reduced content in sucrose.

Advantageously, the wafer is in the form of an edible container, in particular a wafer cone.

The present invention provides wafer composition with a sucrose reduction of 30%, or more, with respect to prior art wafers, without using high intensity sweeteners or polyols, and are still suitable to be shaped into cones with good textural properties.

It is well known that reducing the amount of sugar in a wafer batter will increase the Tg of the wafer. It has been found that to maintain an acceptable Tg (and thus the ability to be rolled) the sugar reduction can be balanced by added fibres to compensate for solids. This has surprisingly show to provide wafers that can be rolled and are resistant to breaking, while the viscosity of the batter for making the wafers allows an efficient production.

The invention also relates to the use of a composition according the wafer composition described herein for the production of a wafer cone, preferably for an ice cream wafer cone.

DETAILED DESCRIPTION OF THE INVENTION

Figure 1:
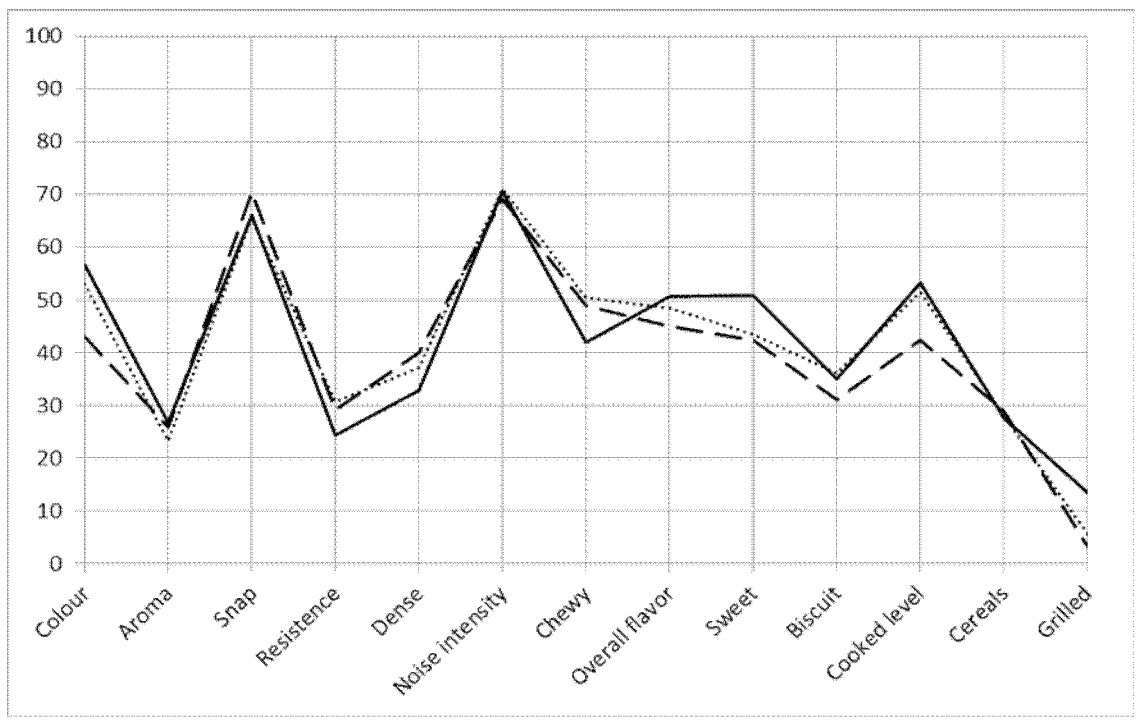
FIG. 1 shows the sensory evaluation of trial 1, example 1 (plain line) example 2 (hashed line) and example 3 (dotted line) are plotted.

Rolled sugar wafers used in frozen confection may be distinguished from other biscuits/cookies in that wafers are the result of baking a batter whereas biscuits/cookies are usually baked out of a dough. Batter is a liquid suspension that will flow through a pipe whereas biscuit dough is rather stiff to permit rolling and flattening and normally has a water content of less than 50 parts per 100 parts of flour.

According to the present invention a sugar reduced wafer or edible container composition is provided.

In the present context the added sugars are mono and di saccharides, excluding lactose of dairy origin.

Further by Carbohydrate is meant: All saccharides and polysaccharides, thus including sugars, and lactose. This definition of carbohydrates does not include non-digestible oligosaccharides, organic acids, alcohols and polyols.

In the present context by dietary fibers is meant: hydro-colloids, digestible polysaccharide. These dietary fibers may contain traces of non-digestible oligosaccharides. Furthermore, by non-digestible fibers is meant: a composition containing at least 60% (in dry mass) of non-digestible oligosaccharide, soluble or insoluble, that escapes digestion in the small intestine of healthy persons and do not raise blood glucose levels. These non-digestible oligosaccharides are obtained for example through chemical (acid hydrolysis) or enzymatic treatment of polysaccharides.

Further, in the present context healthier wafer or edible container which is characterized by having reduced calories combined with reduced oil and mono and di saccharides content.

High intensity sweeteners are Glycyrrhizin and its acid derivatives, Monk fruit, Monatin, Thaumatin, Acesulfame K, Alitame, Aspartame, Aspartame-Acesulfame Salt, Cyclamic acid and its salts, Neohesperidine dihydrochalcone, Neotame, Saccharin and its salts, Sucralose.

It is preferred that the composition according to the invention does not contain, artificial or natural, high intensity sweeteners, and no added fructose or high fructose corn syrup.

Furthermore, it is preferred that the frozen confection mix does not contain, polyols or sugar alcohol, for example Gycerol, Maltitol, Xylitol, Sorbitol.

In the present context by emulsifier is meant a surfactant molecule that has the ability to form a stable emulsion.

Further in the present context unless otherwise indicated % of a component means the % of weight based on the weight of the composition, i.e. weight/weight %.

It has been found that it is possible to provide a healthier wafer for frozen confections without increasing the amount of stabilizers and emulsifiers. It has further been found that the present invention provides a compositions for healthier wafer e.g. wafer cones or edible container for frozen confections which do not contain high intensity sweeteners.

Furthermore, it is preferred that the composition comprises 10-23 wt. % of sucrose added sugar. More preferably the total amount of sucrose is 12-20 wt. %. This give a desirable sweetness to the product while the remaining ingredients proportions remains unchanged in the composition. It provides the flexibility needed to roll or bend the wafer while the added sugar content is low and acceptable from a nutritional point of view.

The composition according to the invention comprises 5-20 wt. % of non-digestible fibers being resistant dextrin and the total amount of mono and disaccharides is 10-25 wt. %; all wt. % being in weight percentage of the composition dry mass. Preferably the mono and disaccharides is 13-21 wt. %. Non digestible fibers have the benefit in terms of increasing total solids without increasing the caloric content. Resistant dextrin are advantageous over other non-digestible oligosaccharides such as inulin for example, because they don't have laxative effects.

It is preferred that the non-digestible fibers is selected from the group consisting of resistant dextrin or inulin, or a combination thereof. Advantageously, the resistant dextrin is maltodextrin.

The following are preferred embodiments of composition for wafers:

The composition comprising 60-80 wt. % of flour. Advantageously, the flour is present in an amount of 60-70 wt. % in the composition.

The flour is preferably selected from the group consisting of wheat, oat, millet, rice, barley, soybean, rye, maize, cassava or a combination thereof.

In a preferred embodiment the flour is wheat flour. The wheat flour is preferably a flour with a protein content between 7 and 11%, more preferably between 9 and 11%, and a water absorption of 54 to 55 to get a constant viscosity of the batter. With little protein the wafer gets fragile and above this amount processing problems may occur.

The composition according to the invention comprises 10-23 wt. % of sucrose.

The wafer composition according to the invention comprise 0.5-3.5, preferably 2.5-3.0 wt. % of oil or fat. The oil is added to impart a flavour to the wafer.

The oil is preferably selected from the group consisting of coconut oil, rapeseed oil, sunflower oil, soy oil, nut oil, a combination, blend or fractions thereof.

The fat is preferably ghee, butter or a combination thereof. A combination of oil and fat may also be used.

It is desirable to add sufficient oil or oil to create a noticeable effect on the taste, however a too high proportion of oil or fat will result in a batter having an unacceptably low viscosity for the preparation of a wafer. Thus it is not desirable to make wafers with high fat or oil recipes from a batter that can be processed on an industrial scale. In addition, too high oil content makes the wafer more fragile.

Furthermore, a too low proportion of oil or fat would create baking issue, because the oil is used as a releasing agent to prevent the wafer sticking to the baking plate.

Preferably the composition according to the invention comprises 35-45 wt. % water.

Conveniently the batter viscosity is at least 2500 cps, more conveniently between 3200 cps and 4000 cps though depending upon the flour used and the requirements for the wafer oven it may be as high as 5000 cps. Below 2500 it has been found that the wafers would be too fragile.

The term "viscosity" as used herein refers to the apparent viscosity of a fluid (e.g. batter) as measured by conventional methods known to those skilled in the art but in particular the method described below is preferred.

The preferred method for measuring viscosity (e.g. of batter examples according to the invention, as well as comparative examples) uses an instrument denoted by the trade designation Brookfield Viscosimetre DV-II+. The method used is follows: measurements were performed on 600 ml of batter in a 1000 ml beaker at a constant temperature of 20° C., using mobile spindle number 3 and with the speed set at 30 rpm. The beaker of batter is placed under the DV-II+ and the spindle lowered into the batter to the correct depth (up to the notch on the mobile spindle). The DV-II+ is put into operation and after 30 seconds the reading in centipoise is recorded on the display of the DV-II+.

Advantageously, the composition according to the invention comprises and emulsifier. The emulsifier is preferably present in an amount of 0.2-3.0 wt. % of emulsifier. Preferably the emulsifier is Lecithin. When lechithin is used, advantageously it is used in an amount of about ¼ of the amount of oil. This provides a good oil dispersion and product texture.

The composition according to the invention preferably comprises 0.5-6 wt. % whey or milk, preferably 0.5-3 wt. % of whey or milk based on dry matter. The whey and milk ingredients provide the advantage of improved flavor and color to the wafer.

For taste the composition according to the invention may comprises 0.1-1.0 wt. % of sodium chloride.

The invention also relates to a baked wafer such as wafer cones or edible container made with a composition as discussed having a water content of 1.0-6.5 wt. % freshly baked. Such a wafer after storage has a water content of 2.5-6.0 wt. %. Preferably the water activity of such a wafer is 0.19 to 0.36 measured with and AquaLab, and with a method as described in the Examples.

The invention also relates to a process for manufacturing a sugar reduced wafer such as wafer cones or edible container. The process comprising the steps of providing a composition as discussed above, adding the composition in onto baking plates or iron in thin layers, baking the layers in an oven at a temperature between 180° C. and 215° C. and shaping the baked wafer thus obtained, before they become rigid.

Typically the thickness of the layers are 1.5 to 3 mm

A preferred baking temperature is from 180° C. to 215° C. and the preferred baking time is from 50 seconds to 75 seconds for wafers. The exact time which is optimal will depend on wafer thickness, recipe and type of wafer being produced.

The composition may advantageously be prepared by a process comprising the steps of mixing water, salt, sucrose and non-digestible fibers,
adding flour to the mixture,
mixing the ingredient and
dispersing lecithin and oil to the mixture.

EXAMPLES

By way of example and not limitation, the following examples are illustrative of various embodiments of the present disclosure.

Unless otherwise indicated all the tests herein are carried out under standard conditions as defined herein. Standard conditions means a relative humidity of 50%±5%, ambient temperature (23° C.±2°).

Ingredients used in the Examples were:
Flour soft wheat with
  7.5 to 9.5% protein (Kjeldahl method),
  20-24% wet gluten (measured with a Glutomatic machine (AACC 38-12),
  11-14% humidity (Oven 4 hrs/104° C.).
Sucrose—White (45 ICUMSA) with 0.5-1.4 mm crystals Dry
Oil coconut:
  C8:0 Caprylic acid 3.8-8.5%,
  C10:0 Capric acid 4.3-9.5%,
  C12:0 Lauric acid 42%-48.9%,
  C14 Myristic acid 15-20%,
  C16:0 Palmitic acid 7-10.5%,
  C18:0 Stearic acid 1.9-4%,
  C18:1 Oleic acid 4.5-9.5%,
  C18:2 Linoleic acid 0.9-2.5%,
  C18:3 Alpha linolenic acid 0.5%
Lecithin Soy Fluid INS322i
  Phospholipids—Phosphatidylinositol: 10.0%,
  Phosphatidylcholine 12%
Resistant Dextrin Powder DE18-21
  (Energy: 245.4 Kcal;
  water 5.5 g;
  protein 0.05 g;
  fat 0 g;
  non-digestible Oligosaccharides (Fibers) 66 g;
  carbohydrates 28.3 g; sugars (mono and di saccharides) 9.4 g;
  ashes and mineral 0.05 g; lactose 0 g; total solids 94.5 g).
Inulin, 9% mono and di saccharides, 89% non-digestible Oligosaccharides (Fibers), water 2%.
Salt—sodium chloride
Materials & Method
Mixing
Ingredients were mixed in a Hass mixer TMN30s.
The mixing sequence was the following:
Water, sucrose, salt and non digestible fibers (Resistant Dextrin or Inulin) are mixed at 550 rpm, then 2 minutes at 650 rpm,
Flour was then added at 800 rpm, then the preparation was mixed 1 minute at 800 rpm
Lecithin and oil are added at 800 rpm, then the preparation was mixed 1 minute at 800 rpm
Mixed 40 second at 900 rpm
Baking
Wafers were baked in a Haas oven (PC Laboratory Cone baking machine LB-STA). Adequate amounts of preparation were poured on a baking plate in order to get 10 g wafers after baking. Wafers were baked for 35 seconds. Temperature of the baking plate was 190-195° C. on the lower side;

200-205° C. on the upper side. The oven was equipped with a device to roll the wafers into cones (Haas, Rolling tool ARW-VTRO).

Water Content

Water content of the wafer was measured with a Mettler Toledo Halogen HR83 balance. 5 wafers were ground; 5 gram of the resulting powder was sampled and heated to 145° C. Water content was measured by sample weight loss during the heating process, each 10 seconds, using a LabX direct moisture software. The measuring was stops when two weight values were similar.

Water Activity

Water activity of the wafer was measured on an Aqualab water activity balance. The water activity was defined as the ratio of the vapor pressure of water in a material to the vapor pressure of pure water at the same temperature. Protocol was similar to the water content measure, water activity was automatically calculated by the balance after approximately 5 minutes drying of the ground wafer sample.

Sensory Analysis

A tasting panel consisting of twelve people trained for ice cream products tasting evaluated the products.

Products were stored at −18° C., 24 h before the tasting.

Comparative evaluation. All products were presented at the same time and attributes were evaluated one by one (all products were evaluated for on attribute then panelist went to the next attribute). 2 repetitions were performed under day light in individual booths.

Sensory attributes were as follow:
Color: Intensity of the wafer color.
Aroma: Intensity of the wafer aroma, before tasting.
Snap: Sharp noise when one takes a bite in the upper part of the wafer
Resistance: Force required to take a part of the wafer when biting
Dense: Density of the wafer when biting
Noise intensity: length of the noise when chewing the wafer
Chewy: Wafer resistance while mastication,
Overall flavor: Intensity of the wafer flavor
Sweet: Sweetness of the wafer
Biscuit: Biscuit taste of the wafer
Cooked level: evaluate the baking degree of the wafer
Cereals: Strength of aromatic note of the wafer
Grilled: Strength of aromatic note of the wafer The data obtained on a sample was analyzed through an ANOVA (Variance analysis); completed with a Duncan test wherein differences are significant if P value <0.05.

Results

TABLE 1

Shows wafer recipes without dairy proteins; reference and sugar reduced (−30%) recipes with and without resistant dextrin.
Trial 1

| Ingredients | Example 1 Standard | | Example 2 (Comparative) −30% Sugar | | Example 3 −30% Sugar + RD | |
|---|---|---|---|---|---|---|
| | Mass (%) | Dry mass (%) | Mass (%) | Dry mass (%) | Mass (%) | Dry mass (%) |
| Water | 39.00 | NA | 39.00 | NA | 39.00 | NA |
| Flour soft wheat | 43.50 | 71.31 | 48.30 | 79.18 | 43.50 | 71.31 |
| Sucrose | 16.00 | 26.23 | 11.20 | 18.36 | 10.70 | 17.54 |
| Oil coconut | 0.45 | 0.74 | 0.45 | 0.74 | 0.45 | 0.74 |
| Lecithin | 0.65 | 1.07 | 0.65 | 1.07 | 0.65 | 1.07 |
| Sodium Chloride | 0.40 | 0.66 | 0.40 | 0.66 | 0.40 | 0.66 |
| Resistant Dextrin | 0.00 | 0.00 | 0.00 | 0.00 | 5.30 | 8.69 |
| TOTAL | 100.00 | 100.00 | 100.00 | 100.00 | 100.00 | 100.00 |
| Mono disaccharides from Resistant Dextrin | 0.00 | 0.00 | 0.00 | 0.00 | 0.50 | 0.82 |
| Total sugar (Sucrose + Resistant Dextrin) | 16.00 | 26.23 | 11.20 | 18.36 | 11.20 | 18.36 |

Example 1, is a standard state of the art recipe without dairy proteins.

Example 2 is a comparative example wherein the amount of sugar has been reduced by about 30% with respect to Example 1, and the total solid mass is balanced with flour. Example 2 is outside the scope of the claimed invention.

Example 3 is a wafer recipe without dairy proteins according to the present invention wherein the sugar amount is reduced by 30% with respect to Example 1. The amount of flour remains unchanged. According to the invention the resistant dextrin provides a balance to the total solids. Mono and di saccharide content of the resistant dextrin is included in the recipe formulation.

Total solid, oil, Lecithin and salt contents are the same for Examples 1 to 3.

Comments

FIG. 1 shows the sensory analysis of Examples 1, 2 and 3.

Examples 1 and 3 have the same color while example 2 is less colored.

Snap and Noise intensity are the same for Examples 1, 2 and 3. Examples 2 and 3 are perceived as slightly more dense, resistant, and chewy than Example 1 (reference).

Example 3 is closer to the reference (Example 1) for the perceived density.

Examples 2 and 3 are perceived as less sweet than Example 1 (reference).

Example 3 has an overall flavor similar to Example 1 (reference). Biscuit, Cereal and cooked flavor notes are similar for Example 1 and 3 but are less perceived for Example 2.

Water activity and water content of Examples 1, 2 and 3 are detailed in table 7.

Wafers obtained according to Example 2 could not be rolled into cones due to an excessive rigidity. High glass transition temperature of wafers according to Example 2 is supposed to be the reason of this rigidity.

On the contrary, Wafer obtained according to Examples 1 and 3 were rolled into a cone.

In conclusion, on a sensory point of view wafers according to Example 3 are perceived as closer to the reference (Example 1) than the wafers simply reduced in sugar (Example 2); regarding processability wafers according to Example 2 are could not be rolled into a cone.

TABLE 2

Trial 2 Wafer recipes with dairy proteins; reference and sugar reduced (−30%) recipes with and without resistant dextrin.

| Ingredients | Example 4 Standard | | Example 5 Comparative example −30% Sugar iso-salt | | Example 6 −30% Sugar + RD iso-salt | |
|---|---|---|---|---|---|---|
| | Mass (%) | Dry mass (%) | Mass (%) | Dry mass (%) | Mass (%) | Dry mass (%) |
| Water | 39.00 | NA | 39.00 | NA | 39.00 | NA |
| Flour soft wheat | 39.40 | 64.59 | 44.70 | 73.28 | 39.40 | 64.59 |
| Sucrose | 17.50 | 28.69 | 12.20 | 20.00 | 11.70 | 19.18 |
| Oil coconut | 1.80 | 2.95 | 1.80 | 2.95 | 1.80 | 2.95 |
| Lecithin | 1.40 | 2.30 | 1.40 | 2.30 | 1.40 | 2.30 |
| Sodium Chloride | 0.10 | 0.16 | 0.10 | 0.16 | 0.10 | 0.16 |
| Whey powder | 0.80 | 1.31 | 0.80 | 1.31 | 0.80 | 1.31 |
| Resistant Dextrin | 0.00 | 0.00 | 0.00 | 0.00 | 5.80 | 9.51 |
| TOTAL | 100.00 | 100.00 | 100.00 | 100.00 | 100.00 | 100.00 |
| Mono disaccharides from Resistant Dextrin | 0.00 | 0.00 | 0.00 | 0.00 | 0.55 | 0.89 |
| Total sugar (Sucrose + Resistant Dextrin) | 17.50 | 28.69 | 12.20 | 20.00 | 12.25 | 20.07 |

Example 4, is a standard recipe with dairy proteins.

Example 5 is a comparative example wherein the amount of sugar has been reduced by about 30% with respect to Example 4, and the total solid mass is balanced with flour. Example 5 is outside the scope of the present invention.

Example 6 is a wafer recipe with dairy proteins according to the present invention wherein the sugar amount is reduced by 30% with respect to Example 4. The amount of flour remains unchanged. The total solid is balanced with resistant dextrin. Mono and di saccharide content of the resistant dextrin has to be considered when formulating the recipe.

Total solids, oil, lecithin, whey powder and salt contents are the same for Examples 4 to 6.

Comments

Figure 2:
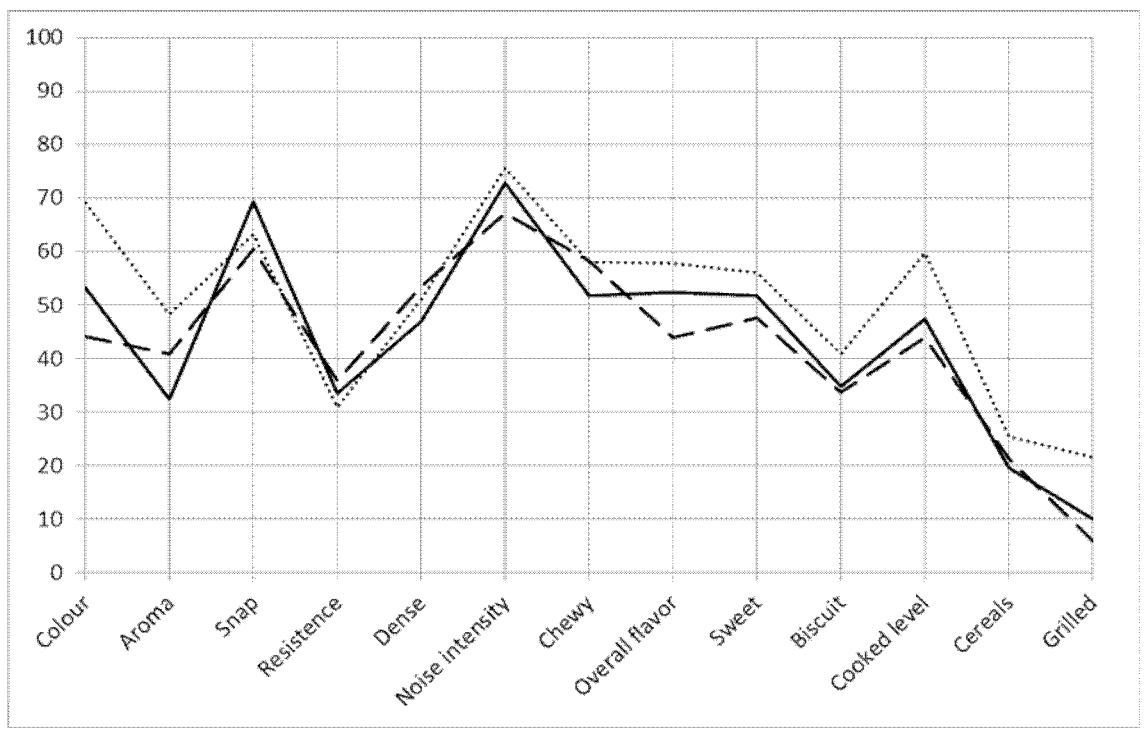
FIG. 2 shows the sensory evaluation of trial 2; example 4 (plain line) example 5 (hashed line) and example 6 (dotted line) are plotted.

FIG. 2 shows the sensory analysis of Examples 4, 5 and 6.

Example 6 is more colored than the reference (example 4); comparative example 5 is less colored than the reference.

Wafer density perceived is the same for Examples 4, 5 and 6. Examples 5 and 6 are perceived with a snap lower than the reference. Noise intensity is lower for Example 5 with respect to Examples 4 and 6.

Example 6 is perceived sweeter and more flavored than Examples 4 and 5.

Water activity and water content of Examples 4, 5 and 6 are detailed in table 7.

Wafers obtained according to Example 5 could not be rolled due to an excessive rigidity. High glass transition temperature of wafers according to Example 5 is supposed to be the reason of this rigidity. On the contrary, Wafer obtained according to Examples 4 and 6 were rolled into a cone.

In conclusion, on a sensory point of view wafers according to Example 6 are perceived with a richer flavor than the reference (Example 4) and the wafers simply reduced in sugar (Example 5); regarding processability wafers according to Example 5 could not be rolled into a cones.

TABLE 3

Wafer recipes without dairy proteins; reference and sugar reduced (−30%) recipes with inulin.
Trial 3

| Ingredients | Example 1 Standard | | Example 7 −30% sucrose + Inulin | |
|---|---|---|---|---|
| | Mass (%) | Dry mass (%) | Mass (%) | Dry mass (%) |
| Water | 39.00 | NA | 39.00 | NA |
| Flour soft wheat | 43.50 | 71.31 | 43.50 | 71.31 |
| Sucrose | 16.00 | 26.23 | 10.70 | 17.54 |
| Oil coconut | 0.45 | 0.74 | 0.45 | 0.74 |
| Lecithin | 0.65 | 1.07 | 0.65 | 1.07 |
| Sodium Chloride | 0.40 | 0.66 | 0.40 | 0.66 |
| Inulin | 0.00 | 0.00 | 5.30 | 8.69 |
| TOTAL | 100.00 | 100.00 | 100.00 | 100.00 |
| Mono di saccharides from Inulin | 0.00 | 0.00 | 0.48 | 0.79 |
| Total sugar (Sucrose + Inulin) | 16.06 | 26.33 | 11.18 | 18.35 |

Example 7 is a wafer recipe without dairy proteins according to the present invention wherein the sugar amount is reduced by 30% with respect to Example 1. The total solid is balanced with inulin. Mono and di saccharide content of inulin has to be considered when formulating the recipe.

Total solid, flour, oil, lecithin and salt contents are the same for Examples 1 and 7.

Comments

Wafers obtained according to Example 7 were perceived less sweet than the wafers from Example 1. Example 7 wafers were rolled into a cone.

Water activity and water content of Example 7 are detailed in table 7.

TABLE 4

Wafer recipes with dairy proteins; reference and sugar reduced (−30%) recipes with inulin.
Trial 4

| Ingredients | Example 4 Standard | | Example 8 −30% Sucrose + Inulin | |
|---|---|---|---|---|
| | Mass (%) | Dry mass (%) | Mass (%) | Dry mass (%) |
| Water | 39.00 | NA | 39.00 | NA |
| Flour soft wheat | 39.40 | 64.59 | 39.40 | 64.59 |
| Sucrose | 17.50 | 28.69 | 11.70 | 19.18 |
| Oil coconut | 1.80 | 2.95 | 1.80 | 2.95 |
| Lecithin | 1.40 | 2.30 | 1.40 | 2.30 |
| Sodium Chloride | 0.10 | 0.16 | 0.10 | 0.16 |
| Whey powder | 0.80 | 1.31 | 0.80 | 1.31 |
| Inulin | 0.00 | 0.00 | 5.80 | 9.51 |
| TOTAL | 100.00 | 100.00 | 100.00 | 100.00 |
| Mono di saccharides from Inulin | 0.00 | 0.00 | 0.53 | 0.87 |
| Total sugar (Sucrose + Inulin) | 17.50 | 28.69 | 12.23 | 20.05 |

Example 8 is a wafer recipe with dairy proteins according to the present invention wherein the sugar amount is reduced by 30% with respect to Example 4. The total solid is balanced with inulin. Mono and di saccharide content of inulin has to be considered when formulating the recipe.

Total solid, flour, oil, whey powder, lecithin and salt contents are the same for Examples 4 and 8.

Comments

Wafers obtained according to Example 8 were perceived less sweet than the wafers from Example 4. Example 8 wafers were rolled into a cone.

Water activity and water content of Example 8 are detailed in table 7.

TABLE 5

Wafer recipes with dairy proteins; reference and sugar reduced (−40%) recipes with resistant dextrin.
Trial 5

| Ingredients | Example 4 Standard | | Example 9 −40% sucrose RD | |
|---|---|---|---|---|
| | Mass (%) | Dry mass (%) | Mass (%) | Dry mass (%) |
| Water | 39.00 | NA | 39.00 | NA |
| Flour soft wheat | 39.40 | 64.59 | 39.40 | 64.59 |
| Sucrose | 17.50 | 28.69 | 9.50 | 15.57 |
| Oil coconut | 1.80 | 2.95 | 1.80 | 2.95 |
| Lecithin | 1.40 | 2.30 | 1.40 | 2.30 |
| Sodium Chloride | 0.10 | 0.16 | 0.10 | 0.16 |
| Whey powder | 0.80 | 1.31 | 0.80 | 1.31 |
| Resistant Dextrin | 0.00 | 0.00 | 8.00 | 13.11 |
| TOTAL | 100.00 | 100 | 100.00 | 100.00 |
| Mono di saccharides from Resistant Dextrin | 0.00 | 0.00 | 0.75 | 1.23 |
| Total sugar (Sucrose + Resistant Dextrin) | 17.50 | 28.69 | 10.25 | 16.81 |

Example 9 is a wafer recipe with dairy proteins according to the present invention wherein the sugar amount is reduced by about 40% with respect to Example 4. The total solid is balanced with resistant dextrin. Mono and di saccharide content of resistant dextrin has to be considered when formulating the recipe.

Total solid, flour, oil, whey powder, lecithin and salt contents are the same for Examples 4 and 9.

Comments

Wafers obtained according to Example 9 were perceived less sweet than the wafers from Example 1. Example 9 wafers were rolled into a cone.

Water activity and water content of Example 9 are detailed in table 7.

TABLE 6

Wafer recipes with dairy proteins; reference and sugar reduced (−50%) recipes with resistant dextrin.
Trial 6

| Ingredients | Example 4 Standard | | Example 10 −50% sucrose RD | |
|---|---|---|---|---|
| | Mass (%) | Dry mass (%) | Mass (%) | Dry mass (%) |
| Water | 39.00 | NA | 39.00 | NA |
| Flour soft wheat | 39.40 | 64.59 | 39.40 | 64.59 |
| Sucrose | 17.50 | 28.69 | 7.50 | 12.30 |
| Oil coconut | 1.80 | 2.95 | 1.80 | 2.95 |
| Lecithin | 1.40 | 2.30 | 1.40 | 2.30 |

TABLE 6-continued

Wafer recipes with dairy proteins; reference and sugar reduced (−50%) recipes with resistant dextrin.
Trial 6

| Ingredients | Example 4 Standard | | Example 10 −50% sucrose RD | |
|---|---|---|---|---|
| | Mass (%) | Dry mass (%) | Mass (%) | Dry mass (%) |
| Sodium Chloride | 0.10 | 0.16 | 0.10 | 0.16 |
| Whey powder | 0.80 | 1.31 | 0.80 | 1.31 |
| Resistant Dextrin | 0.00 | 0.00 | 10.00 | 16.39 |
| TOTAL | 100.00 | 100.00 | 100.00 | 100.00 |
| Mono di saccharides from Resistant Dextrin | 0.00 | 0.00 | 0.94 | 1.54 |
| Total sugar (Sucrose + Resistant Dextrin) | 17.50 | 28.69 | 8.44 | 13.84 |

Example 10 is a wafer recipe with dairy proteins according to the present invention wherein the sugar amount is reduced by about 50% with respect to Example 4. The total solid is balanced with resistant dextrin. Mono and di saccharide content of resistant dextrin has to be considered when formulating the recipe.

Total solid, flour, oil, whey powder, lecithin and salt contents are the same for Examples 4 and 10.

Comments

Wafers obtained according to Example 7 were perceived much less sweet than the wafers from Example 1. Example 10 wafers were rolled into a cone.

Water activity and water content of Example 10 are detailed in table 7.

Water activity and water content of the wafers produced according to Examples 1 to 10 are listed in table 7.

TABLE 7

Water activity and water content of Examples 1 to 10.

| | Water activity | Water content (%) |
|---|---|---|
| Example 1 | 0.17 | 2.46 |
| Example 2 | 0.19 | 2.95 |
| Example 3 | 0.33 | 4.98 |
| Example 4 | 0.25 | 3.66 |
| Example 5 | 0.30 | 5.21 |
| Example 6 | 0.25 | 3.17 |
| Example 7 | 0.33 | 4.84 |
| Example 8 | 0.31 | 4.56 |
| Example 9 | 0.25 | 3.83 |
| Example 10 | 0.36 | 5.58 |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A sugar reduced wafer composition comprising:
60-80 wt. % of flour;
10-20 wt. % of sucrose;
0.5-8.0 wt. % of oil or fat; and
5-20 wt. % of non-digestible fiber selected from the group consisting of inulin, resistant dextrin, and a combination thereof, wherein a total amount of mono and disaccharides is 10-25 wt. %, all wt. % being in weight percentage of the sugar reduced wafer composition dry mass.

2. The sugar reduced wafer composition according to claim 1 comprising 0.2-3.0 wt. % emulsifier.

3. The sugar reduced wafer composition according to claim 1 comprising 0.5-6 wt. % whey or milk.

4. The sugar reduced wafer composition according to claim 1 comprising 0.5-3 wt. % oil or fat.

5. The sugar reduced wafer composition according to claim 4, wherein the oil is selected from the group consisting of coconut oil, rapeseed oil, sunflower oil, soy oil, nut oil, and a combination, blend or fractions thereof.

6. The sugar reduced wafer composition according to claim 1 comprising 0.1-1.0 wt. % of sodium chloride.

7. The sugar reduced wafer composition according to claim 1, wherein the sugar reduced wafer composition does not contain any polyols or high intensity sweeteners.

8. The sugar reduced wafer composition according to claim 1, wherein the total amount of mono and disaccharides is 13-21 wt. %.

9. The sugar reduced wafer composition according to claim 1, wherein a total amount of sucrose is 12-20 wt. %.

10. The sugar reduced wafer composition according to claim 1 comprising 35-45 wt. % water.

11. The sugar reduced wafer composition according to claim 1, wherein the sugar reduced wafer composition has a viscosity between 2500 cps and 5000 cps.

12. A baked wafer comprising a sugar reduced wafer composition comprising 60-80 wt. % of flour, 10-20 wt. % of sucrose, 0.5-8.0 wt. % of oil or fat, and 5-20 wt. % of non-digestible fibers selected from the group consisting of inulin, resistant dextrin, and a combination thereof, wherein a total amount of mono and disaccharides is 10-25 wt. %, all wt. % being in weight percentage of the sugar reduced wafer composition dry mass, and the baked wafer having a water content after baking of 1.0-6.5 wt. % and a water content after storage of 2.5-6.0 wt. %.

13. A process for manufacturing a sugar reduced wafer, the process comprising:
providing a composition comprising 60-80 wt. % of flour, 10-20 wt. % of sucrose, 0.5-8.0 wt. % of oil or fat, and 5-20 wt. % of non-digestible fibers selected from the group consisting of inulin, resistant dextrin, and a combination thereof, wherein a total amount of mono and disaccharides is 10-25 wt. %, all wt. % being in weight percentage of the composition dry mass;
adding the composition into a baking plate or iron;
baking the composition in an oven at a temperature between 180° C. and 215° C. for 50 to 75 sec to obtain a baked wafer; and
shaping the baked wafer before the baked wafer becomes rigid.

14. The sugar reduced wafer composition according to claim 1, wherein at least 60% in dry mass of the non-digestible fiber is non-digestible oligosaccharides.

15. The baked wafer according to claim 12, wherein at least 60% in dry mass of the non-digestible fibers are non-digestible oligosaccharides.

16. The process according to claim 13, wherein at least 60% in dry mass of the non-digestible fibers are non-digestible oligosaccharides.

17. The sugar reduced wafer composition according to claim 1 comprising 10-12 wt. % of the sucrose.

18. The baked wafer according to claim 12 comprising 10-12 wt. % of the sucrose.

19. The process according to claim 13, wherein the composition comprises 10-12 wt. % of the sucrose.

* * * * *